UNITED STATES PATENT OFFICE.

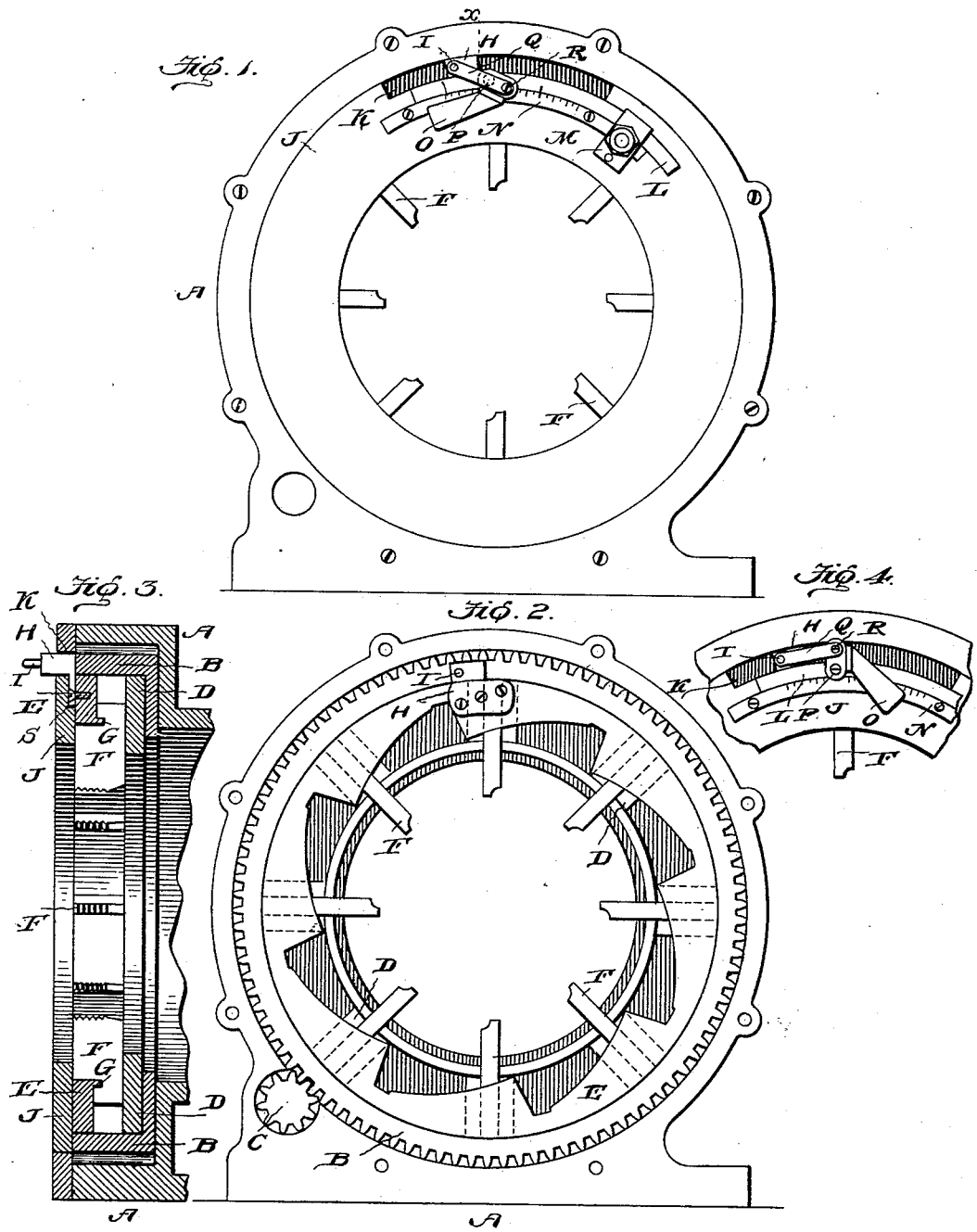

MICHAEL C. SEREN, OF TOLEDO, OHIO.

DIE-HOLDER FOR SCREW-THREADING MACHINES.

SPECIFICATION forming part of Letters Patent No. 638,601, dated December 5, 1899.

Application filed May 13, 1899. Serial No. 716,657. (No model.)

*To all whom it may concern:*

Be it known that I, MICHAEL C. SEREN, a citizen of the United States, residing at Toledo, in the county of Lucas and State of Ohio, have invented a certain new and useful Adjusting-Rod and Lock for Shifting and Holding Dies in Pipe-Threading and Bolt Machines, of which the following is a specification.

The objects of my invention are, first, the provision of means whereby the cam and dies can be adjusted or set temporarily in any of the possible positions within the range of the machine for the threading of a certain substantially uniform diameter of pipe or bolt, and, secondly, the provision of additional means whereby the cam and dies may repeatedly be shifted alternately to release the dies from the pipe or bolt and to force and lock the same in contact therewith, the said means to be simple in construction, efficient in operation, not liable to become inoperative, adapted to be easily and quickly manipulated, and, withal, to constitute a superior instrumentality for the purposes intended.

With these ends in view my invention consists, objectively, in a pipe or bolt threading machine having a plurality of shifting mechanisms, one for adjusting the dies for threading pipe or bolts of a uniform diameter and the other for releasing the dies from and locking them in contact with a pipe or bolt.

It further consists in certain novelties of construction and combinations of parts hereinafter described and claimed.

The drawings illustrate one example of each type of mechanism constructed, arranged, fashioned, and combined according to the best modes I have so far devised for the application of the principles.

Figure 1 is a face view in elevation of a pipe or bolt threading machine illustrating adjacent the top edge thereof an adjusting-rod and a toggle-lever and lock in closed position. Fig. 2 is a view of the machine with the face-plate and shifting mechanisms removed and disclosing the ring with cam-slots and the spur-gear intermeshing with a pinion. Fig. 3 is a section on line $x$ of Fig. 1, with the toggle-lever removed and showing the relative positions of the several parts of the machine when united for use. Fig. 4 shows the position assumed by the toggle-lever and lock when the dies are retracted from a pipe to allow its withdrawal.

Referring to the several figures, the letter A designates the frame of the machine; B, a spur-gear; C, a pinion journaled in the frame and adapted to impart rotary motion to the spur-gear; D, the die-holder, which may be of any approved type or species; E, a ring having cam-slots of the general shape shown.

F are dies.

G are flanges on the ring, each flange adapted to loosely engage a recess or notch made in a die and to advance and retract the same when the cam is rotated through the arc of a circle.

H is a clip having a projecting lug attached to the edge of the cam-ring by a screw or in any other way or manner; I, a journal-post projecting from the lug; J, the face-plate; K, a recess in the edge of the face-plate made by cutting away a portion of the body of the metal or fashioned in the process of casting; L, an adjusting-rod in practice having a single index-point; M, a friction grip or block provided with a nut and beneath or through which the adjusting-rod is adapted to slide; N, an index-bar provided with a suitable scale on its face and serving also as a guide for the rod; O, a handle; P, a screw or bolt by which the handle is pivoted to the adjusting-rod; Q, a link journaled or pivoted at one end to the post I, which latter is shown in connection with the clip H, having the lug; and R is a screw, bolt, or journal by which the handle O is pivoted to the opposite end of the link.

It will be observed that the lug carried by the clip H projects through and some distance beyond the slot K and that the clip itself travels in a groove S, made by cutting away the back of the face-plate J, adjacent the face of the cam-ring. The clip may be detachably secured to the ring in any convenient way, as by a screw with a countersunk head, as shown in the section.

The method of operating the machine in combination with my novel mechanisms is as follows: Suppose it is desired to thread pipe or bolts of a certain uniform diameter within the range of the machine. The handle O is first caused to take the position shown in Fig.

1, where the cam E is locked against rotation relative to the face-plate J. Then the adjusting-rod L is released from the friction grip or block M by unscrewing the nut, and finally the adjusting-rod is moved in any convenient way along with the cam, toggle-lever, and handle till the index-point on the rod is adjacent the figure or mark of the scale on the bar corresponding to the diameter of the pipe or bolt to be threaded, in which position the nut is screwed down and the friction-block caused to grip the rod and hold the parts in their fixed relative positions. Now by moving the handle O of the toggle-lever to the position shown in Fig. 4 the cam will be rotated through a small arc of a circle and the dies retracted a sufficient distance to allow the introduction of the predetermined diameter of pipe or bolt to be threaded. A reverse movement of the handle O will obviously shift the cam and dies and force the latter against the outer surface of the pipe or bolt, and in which positions they will be securely held, inasmuch as the handle O, rod L, and link Q, when pivotally united, as shown, form a lock. In the locked position (see Fig. 1) the bolt P occupies a position to one side of a line joining the journal-post I and journal R, or, differently stated, the journal R has been moved from the position shown in Fig. 4 to a position beyond a straight line joining the post I and bolt or screw P, which unites the rod L and the handle. After the pipe has been threaded the dies can be again retracted by a simple movement of the handle, the pipe withdrawn, and another one inserted and the handle again reversed, and so on indefinitely.

The secondary shifting mechanism, as distinguished from the rod L and friction-grip M, which constitute the primary adjusting or shifting mechanism, may be denominated a "toggle-lever and lock," as it possesses a double function.

In order to thread pipe or bolts of a different diameter, the adjusting-rod, carrying with it the cam-ring, is shifted to the desired position and the toggle-lever and lock repeatedly manipulated in a manner as previously described.

From the foregoing it is clear that I have produced means for shifting and holding and locking the dies of pipe and bolt threading machines which are of great practical value and which fulfil all the conditions set forth as the object of my invention, besides possessing other desirable features and characteristics. My improvements, moreover, will be recognized and appreciated by those familiar with the operation of such machines.

While I have illustrated and described only one example of the physical embodiment of each type of my invention, I do not thereby intend to exclude from the scope of my claims other examples which differ therefrom merely in colorable or formal features, inasmuch as the principles of the improvements may be applied in other modes and in shapes which present a different appearance to the physical eye, but which still preserve the modes of operation.

What I claim as new, and desire to secure by Letters Patent, is—

1. The combination with a pipe and bolt threading machine having means for shifting the cam and dies for threading pipe or bolts of a uniform diameter within the range of the machine, of an integral toggle-lever and lock mechanism consisting of a link, as Q, and a handle, O, pivotally uniting the cam-ring and face-plate; the said handle being pivoted to move in a plane parallel with the face-plate; in substance as set forth.

2. The combination with a pipe and bolt threading machine, of a toggle-lever and lock mechanism for shifting and locking the cam-ring and dies relative to the face-plate; the journal R when the cam-ring is locked occupying a position beyond a straight line joining the journal-post I and bolt or screw P; in substance as set forth.

3. The combination with a pipe and bolt threading machine having a cam-ring and face-plate, of a friction-grip, M, an adjusting-rod, L, a handle, O, a link, Q, and means for pivotally joining the link to the cam-ring; the said handle adapted to be rotated in a plane parallel with the face-plate and in one extreme position to constitute a lock; substantially as set forth.

In testimony whereof I affix my signature in presence of two witnesses.

MICHAEL C. SEREN.

Witnesses:
C. E. SUTTON,
C. E. CARTWRIGHT.